C. I. ROBINSON.
UTILIZING ACID SLUDGE FROM REFINING PETROLEUM.
APPLICATION FILED AUG. 21, 1903.
1,014,520.
Patented Jan. 9, 1912.
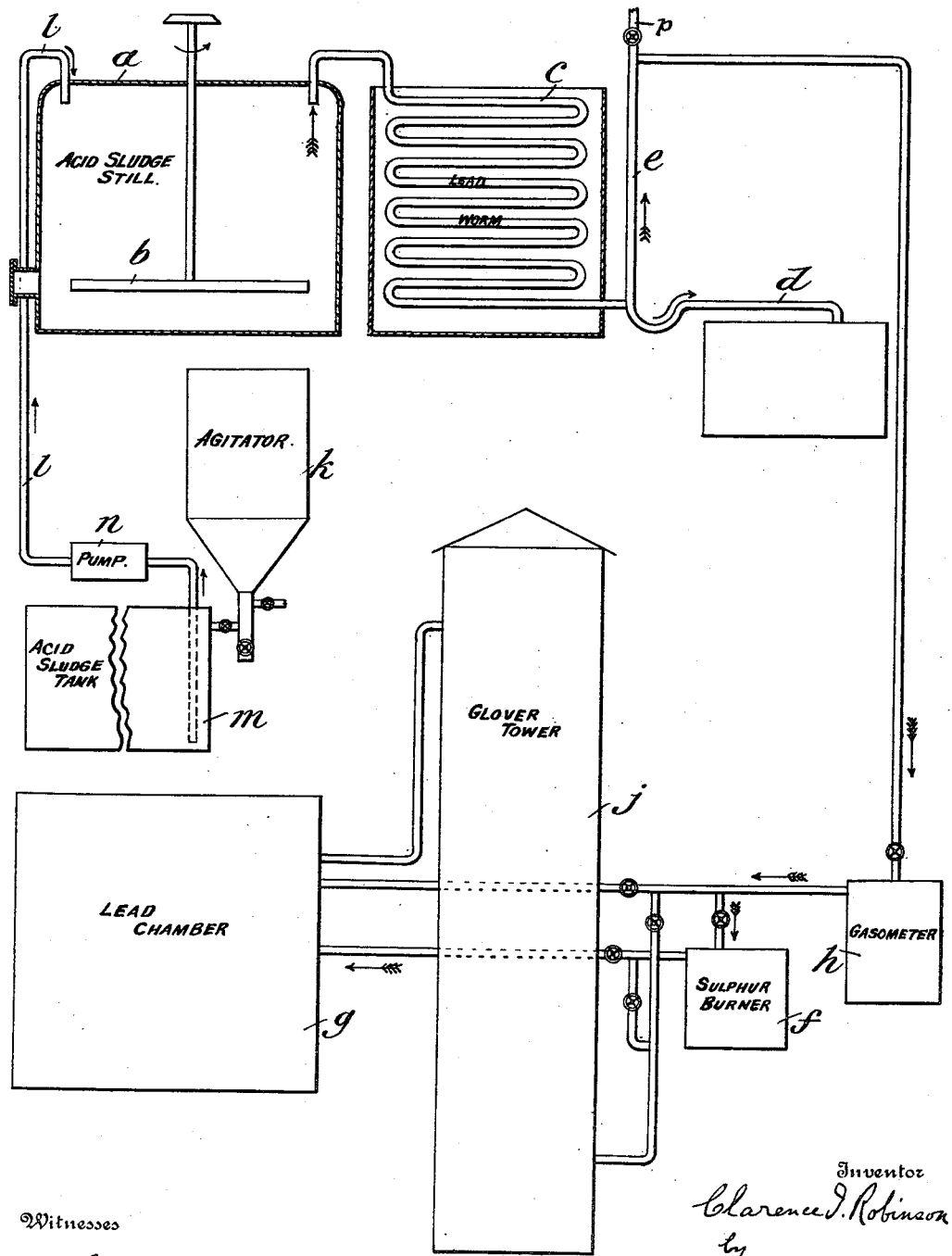

UNITED STATES PATENT OFFICE.

CLARENCE I. ROBINSON, OF WEST NEW BRIGHTON, NEW YORK, ASSIGNOR TO STANDARD OIL COMPANY, OF BAYONNE, NEW JERSEY, A CORPORATION OF NEW JERSEY.

UTILIZING ACID SLUDGE FROM REFINING PETROLEUM.

1,014,520.  Specification of Letters Patent.  Patented Jan. 9, 1912.

Application filed August 21, 1903. Serial No. 170,326.

*To all whom it may concern:*

Be it known that I, CLARENCE I. ROBINSON, a citizen of the United States, residing at West New Brighton, in the county of Richmond and State of New York, have invented certain new and useful Improvements in Utilizing Acid Sludge from Refining Petroleum; and I do hereby declare the following to be a full, clear, and exact description of the invention, such as will enable others skilled in the art to which it appertains to make and use the same.

This invention relates more particularly to the utilization of the acid sludge (or spent acid) which results as a by-product in treating burning oil (kerosene) distillate and other petroleum products. It is a dark, thick liquid which settles below the supernatant oil, after the oil has been subjected to sulfuric acid by admixture therewith, upon its being allowed to stand so that separation by gravity may take place.

When acid sludge is heated, sulfur dioxid is given off in a state of sufficient purity to be utilized for the production of sulfuric acid (including anhydrid, as well as more or less hydrated acid) and for most (if not all) of the other uses to which sulfur dioxid is put, as, for example, the manufacture of sulfite or bisulfite salts, of sulfurous acid solutions, or of sulfur (this last by the known reaction, for example, with hydrogen sulfid.)

I have discovered that, in order thus to utilize the sludge to the best advantage, it is important, first, to heat the sludge in bulk (say, in a compact body of several barrels at a minimum) with gradual rise of temperature, in order to evolve the sulfur bearing gas without carrying the sludge against the crown of the containing vessel and into the gas exit therefrom as a result of a too rapid decomposition of the sulfur bearing hydrocarbons and at the same time to supply sufficient heat to the sludge to keep up a good delivery of gas (say, not less than about ten cubic feet an hour per barrel of sludge); second, to agitate the sludge during the heating in order to keep down the foaming; third, to raise the temperature of the sludge to above 500° F. (say, to about 600° F., such rise having been found sufficient in my experience) in order to get off gas containing practically all of the sulfur content of the sludge, some six or eight per cent. of the sulfur originally present in the sludge, according to my experience, coming over as hydrogen sulfid toward the end of the heating and, fourth, after cooling the gas evolved from the sludge to the condensing point of oil vapors therein and so effecting their separation, to heat the gas to combustion temperature with access of air, as by passage over burning sulfur (in the form of elementary sulfur or of pyrites or other sulfur bearing material), in order to burn the combustible constituents of the gas and at the same time raise the temperature of the latter.

In accordance with the present invention, therefore, in its complete form, use is made of a procedure which embodies each and all of these discoveries, the sulfur dioxid of the gas being finally oxidized to sulfuric acid, say, in the ordinary lead chambers or in a contact apparatus or partly in the latter and partly in the former. Without exceeding the limits of the invention, however, various modifications and omissions in this procedure can be made. In fact, to be within said limits, it is only necessary that the substance of one or more of the hereinafter written claims should be taken. Without attempting an exhaustive recital of what may be done within said limits, the following modifications or omissions may be here mentioned as within the same: The gas (after the specified passage over burning sulfur) could be subjected to one or more operations as above set forth for utilizing sulfur dioxid otherwise than for making sulfuric acid; or the subjection of the gas to any such operations could be omitted. The gas may be subjected to combustion temperature with access of air otherwise than by passage over burning sulfur in order to burn the combustible constituents; or such subjection could be omitted at the option of the manufacturer, where the necessities of the case permit. The cooling of the gas to condense the oil vapors therein could be omitted, with or without subjecting the gas to combustion temperature with access of air by passage over burning sulfur or otherwise, where the necessities of the case permit. If the combustible constituents of the gas should be burned without the removal of the oil vapors therefrom, the result would be a considerable proportion of carbonic acid, so large a proportion, in fact, as seriously to interfere with (if it should not practically prevent) the conversion of the sulfur dioxid into sulfuric acid; although for other uses it might be less (or not at all) serious. The presence of foreign ingredients with the sulfur dioxid, or their removal therefrom, would be at the option of the manufacturer and the necessities of the case. The agitation of the sludge during the heating operation could be omitted, if difficulty from foaming of the sludge should not be too serious or if it should be otherwise provided for. Sulfur dioxid commences to be evolved below 500° F. (at about 220° F., according to my experience) and, except to obtain a greater yield, the sludge need not be heated above 500° F. Acid sludge will yield sulfur dioxid when otherwise heated as well as when heated in bulk; although the latter heating conduces (as I believe) to the amount of the yield as well as to rapidity and economy of operation; and, except to obtain the advantages of heating in bulk, other heating may be resorted to.

The accompanying drawing is a diagram of an apparatus invented by me, which is useful for carrying the present invention into effect and which I originally claimed herein; but, in consequence of official requirement of division, said apparatus has been included in the subject of application No. 363,713, filed by me on March 21, 1907, as a division and continuation of my application of August 21, 1903, No. 170,327 and in part also as a continuation hereof.

The following is a description of what is considered the best mode of carrying out the present invention in its complete form by the aid of such apparatus. Any suitable apparatus can be used.

The manner of carrying out the invention with modifications or omissions as indicated herein above will be sufficiently apparent from the following description, in view of the other parts of the specification.

A box-like still $a$ of suitable capacity having a rotary stirrer $b$ for agitating its contents is supplied with a charge of acid sludge which should not exceed two hundred barrels for a still of a capacity of five hundred barrels. The charge is supplied from agitator $k$ through pipe line $l$, which is provided with a storage tank $m$ and a pump $n$; heat is applied to the still, and the charge of sludge therein is agitated. The still may be of iron and be heated by fire in any known or suitable way. The heat is so regulated as to keep up a good delivery of gas, say, about 2,500 cubic feet, more or less, per hour. At about 220° F. the evolution of gas begins; and at about 600° F. it is practically over, only coke remaining in the still. The coke is removed and the still supplied again with sludge. The temperature in the still may be ascertained by a thermometer having its bulb in the liquid. The gas evolved is passed through condenser $c$ (having a lead worm) wherein it is cooled so as to condense the oil vapors which may be carried over with it. A small quantity of oil (equal, say, to about two per cent., more or less, by volume of the original charge of sludge) is thus obtained which is trapped off by the pipe $d$ for use as fuel or to be otherwise disposed of. As the sludge itself contains those hydrocarbons only which unite with the sulfuric acid of the refining treatment (except as other hydrocarbons may be accidentally or incidentally present) the oil from pipe $d$ consists substantially of the former hydrocarbons or of bodies resulting from their decomposition. It varies according to the product or products which have been subjected to the treatment with sulfuric acid and also according to the particular kind or kinds of petroleum from which such product or products have been derived and to the sulfuric acid (acid of 66° B. gravity, fuming sulfuric acid, and so on) employed for treating. It contains (in my experience) some hydrocarbons of the volatility of naphtha and some with boiling points above 600° F.; but it is mostly composed of hydrocarbons with boiling points between those limits. The gas is carried off by the gas pipe $e$ to the burner $f$ and lead chamber $g$ (or other suitable sulfuric acid making apparatus). At $h$ a gasometer is indicated for storing the gas; and at $j$ a tower (Glover tower) through which the gas may be passed before it enters the lead chamber $g$.

At $p$ is indicated the beginning of a valved branch line for switching out the gas, instead of allowing it to pass to the apparatus for making sulfuric acid, should it be desired at any time so to do. Occasion for this would be most apt to arise, if at all, at the beginning of the decomposition, on account of the larger proportion in some cases of hydrocarbons then present in the gas. The gas, when switched out, can be used as fuel, or be otherwise disposed of, as the manufacturer may determine.

In removing (by heat as aforesaid) the last portion of the sulfur from the sludge there is formed a certain amount of hydrogen sulfid (representing some six to eight per cent. of the sulfur originally present in the sludge, according to my experience). It is advisable to burn this; for which purpose the gas is raised to combustion temperature with access of air by passage through the burner $f$, wherein sulfur (in the form of elementary sulfur or of sulfur bearing material, as pyrites or hydrogen sulfid, for example) is in combustion. Other combustible materials in the gas (gaseous hydrocarbons, for example) would thus be burned as well as the hydrogen sulfid. Moreover, the gas which has been cooled in the condenser $c$ should have its temperature raised before it is delivered to the tower $j$ or lead chamber $g$. By passage through burner $f$ its elevation in temperature is secured without any expenditure of fuel for that purpose. The products of the combustion of the sulfur in burner $f$ are mixed with the gas and pass with it to the lead chamber, for conversion into sulfuric acid. The gas may (it is believed with advantage) be passed over sulfur in combustion at all other times as well as during the latter portion of the sludge heating operation when hydrogen sulfid is produced.

I claim as my invention and discovery:

1. In utilizing acid sludge, the improvement consisting in heating the acid sludge in a compact body of several barrels at a minimum to above 500° F., to evolve sulfur containing gas therefrom, cooling said gas to separate the oil vapors from it, then subjecting the gas to combustion temperature with access of air to burn the combustible constituents of the gas without oxidizing the sulfur dioxid therein, and afterward oxidizing the sulfur dioxid in the gas to from sulfuric acid, substantially as described.

2. In utilizing acid sludge, the improvement consisting in subjecting gas from the decomposition of acid sludge by heat at lower temperatures to combustion temperature with access of air to burn the combustible constituents of the gas without oxidizing the sulfur dioxid therein, and afterward oxidizing the sulfur dioxid in the gas to form sulfuric acid, substantially as described.

3. In utilizing acid sludge, the improvement consisting in subjecting gas from the decomposition of acid sludge by heat at lower temperatures to combustion temperature with access of air to burn the combustible constituents of the gas without oxidizing the sulfur dioxid therein, and afterward subjecting it to operations adapted to utilize the sulfur content of sulfur dioxid, substantially as described.

4. In utilizing acid sludge, the improvement consisting in causing gas from the decomposition of acid sludge by heat to pass over burning sulfur, and afterward subjecting it to operations adapted to utilize the sulfur content of sulfur dioxid, substantially as described.

5. In utilizing acid sludge, the improvement consisting in causing gas from the decomposition of acid sludge by heat to pass over burning sulfur, and then subjecting it while still hot to operations adapted to oxidize sulfur dioxid, substantially as described.

6. In utilizing acid sludge, the improvement consisting in obtaining gas from the decomposition of acid sludge at temperatures rising gradually to above 500° F., subjecting the so obtained gas to combustion temperature with access of air to burn the combustible constituents of the gas without oxidizing the sulfur dioxid therein, and afterward subjecting the gas to operations adapted to utilize the sulfur content of sulfur dioxid, substantially as described.

7. In utilizing acid sludge, the improvement consisting in heating the acid sludge in a compact body of several barrels at a minimum to temperatures sufficient to evolve gas which contains sulfur dioxid, subjecting the so evolved gas to combustion temperature with access of air to burn the combustible constituents of the gas without oxidizing the sulfur dioxid therein, and afterward subjecting the gas to operations adapted to utilize the sulfur content of sulfur dioxid, substantially as described.

8. In utilizing acid sludge, the improvement consisting in heating the acid sludge in a compact body of several barrels at a minimum to temperatures sufficient to evolve gas which contains sulfur dioxid, cooling said gas to separate the oil vapors from it, subjecting the gas to combustion temperature with access of air to burn the combustible constituents of the gas without oxidizing the sulfur dioxid therein, and afterward oxidizing the sulfur dioxid in the gas to form sulfuric acid, substantially as described.

9. In utilizing acid sludge, the improvement consisting in heating the acid sludge with gradual rise of temperature after attaining a degree sufficient to evolve gas which contains sulfur dioxid, cooling the evolved gas to condense and so to separate therefrom the oil vapors, and then subjecting the gas to heat with access of air under conditions which effect combustion of gaseous hydrocarbon and hydrogen sulfid and leave sulfur dioxid unoxidized, substantially as described.

10. In utilizing acid sludge, the improvement consisting in heating the acid sludge with gradual rise of temperature after attaining a degree sufficient to evolve gas which contains sulfur dioxid, and subjecting the gas to heat with access of air under conditions which effect combustion of gaseous hydrocarbon and hydrogen sulfid and leave sulfur dioxid unoxidized, substantially as described.

11. In utilizing acid sludge, the improvement consisting in subjecting to heat with access of air the gas from heating the acid sludge with gradual rise of temperature after attaining a degree sufficient to evolve gas which contains sulfur dioxid, such subjection being performed under conditions which effect combustion of gaseous hydrocarbons and hydrogen sulfid and leave sulfur dioxid unoxidized, substantially as described.

12. In utilizing acid sludge, the improvement consisting in gradually heating the acid sludge while retaining the main part of its acid therein and in a compact body of several barrels at a minimum to temperatures sufficient to evolve gas which contains sulfur dioxid, continuing such heating until gas which contains the larger part of the sulfur content of the sludge has been so evolved, collecting the so evolved gas appropriately for utilizing its sulfur content, and subjecting it to operations adapted to utilize the sulfur content of sulfur dioxid, substantially as described.

13. In utilizing acid sludge, the improvement consisting in gradually heating the acid sludge while retaining the main part of its acid therein and in a compact body of several barrels at a minimum to temperatures sufficient to evolve gas which contains sulfur dioxid, continuing such heating with regulation of the heat to keep up a delivery of not less than ten cubic feet of gas an hour per barrel of sludge until gas which contains the larger part of the sulfur content of the sludge has been so evolved, collecting the so evolved gas appropriately for utilizing its sulfur content, and subjecting it to operations adapted to utilize the sulfur content of sulfur dioxid, substantially as described.

14. In utilizing acid sludge, the improvement consisting in gradually heating the acid sludge while retaining the main part of its acid therein and in a compact body of several barrels at a minimum to temperatures sufficient to evolve gas which contains sulfur dioxid, continuing such heating while gradually raising the temperature of the batch of sludge as a whole until gas which contains the larger part of the sulfur content of the sludge has been so evolved, collecting the so evolved gas appropriately for utilizing its sulfur content, and subjecting it to operations adapted to utilize the sulfur content of sulfur dioxid, substantially as described.

15. In utilizing acid sludge, the improvement consisting in gradually heating the acid sludge while retaining the main part of its acid therein and in a compact body of several barrels at a minimum to temperatures sufficient to evolve gas which contains sulfur dioxid, agitating the acid sludge during the heating, continuing such heating with agitation until gas which contains the larger part of the sulfur content of the sludge has been so evolved, collecting the so evolved gas appropriately for utilizing its sulfur content, and subjecting it to operations for utilizing the sulfur content of sulfur dioxid, substantially as described.

16. In utilizing acid sludge, the improvement consisting in gradually heating the acid sludge while retaining the main part of its acid therein and in a compact body of several barrels at a minimum to temperatures sufficient to evolve gas which contains sulfur dioxid, continuing such heating until gas which contains the larger part of the sulfur content of the sludge has been so evolved, collecting the so evolved gas appropriately for utilizing its sulfur content, and converting the sulfur dioxid therein into sulfuric acid, substantially as described.

17. In utilizing acid sludge, the improvement consisting in gradually heating the acid sludge in its customary state of dryness while retaining the main part of its acid therein and in a compact body of several barrels at a minimum to temperatures sufficient to evolve gas which contains sulfur dioxid, agitating the acid sludge during the heating, and continuing such heating with agitation until gas which contains the larger part of the sulfur content of the sludge has been so evolved, substantially as described.

18. In utilizing acid sludge, the improvement consisting in gradually heating the acid sludge while retaining the main part of its acid therein and in a compact body of several barrels at a minimum to temperatures above 500° F., continuing such heating until the evolution of sulfur containing gas is practically over, collecting the so evolved gas appropriately for utilizing its sulfur content, and converting the sulfur dioxid therein into sulfuric acid, substantially as described.

In testimony whereof I affix my signature, in presence of two witnesses.

CLARENCE I. ROBINSON.

Witnesses:
J. E. EGGLESTON,
A. P. ARNOLD.